United States Patent
Von Der Weid

(10) Patent No.: US 8,229,302 B2
(45) Date of Patent: Jul. 24, 2012

(54) METHOD AND ARRANGEMENT FOR POLARIZATION MODE DISPERSION MITIGATION

(75) Inventor: Jean Pierre Von Der Weid, Rio De Janeiro (BR)

(73) Assignee: Ericsson Telecommunications S.A., Sao Paulo-SP (BR)

( * ) Notice: Subject to any disclaimer, the term of this patent is extended or adjusted under 35 U.S.C. 154(b) by 723 days.

(21) Appl. No.: 12/159,345

(22) PCT Filed: Nov. 8, 2006

(86) PCT No.: PCT/BR2006/000245
§ 371 (c)(1),
(2), (4) Date: Feb. 6, 2009

(87) PCT Pub. No.: WO2007/073586
PCT Pub. Date: Jul. 5, 2007

(65) Prior Publication Data
US 2009/0190930 A1 Jul. 30, 2009

Related U.S. Application Data

(60) Provisional application No. 60/754,321, filed on Dec. 29, 2005.

(51) Int. Cl.
*H04B 10/12* (2006.01)

(52) U.S. Cl. ........ 398/147; 398/158; 398/159; 398/152; 398/65; 398/161; 398/81; 385/11; 385/24; 385/27; 385/123

(58) Field of Classification Search ............... 398/147, 398/152, 158, 159, 161, 81, 65, 141, 148, 398/149, 79, 162, 33, 38, 25, 26, 27; 385/11, 385/24, 27, 28, 123
See application file for complete search history.

(56) References Cited

U.S. PATENT DOCUMENTS 5,930,414 A * 7/1999 Fishman et al. ............... 385/11
6,647,176 B1 * 11/2003 Pua et al. ..................... 385/24
(Continued)

FOREIGN PATENT DOCUMENTS

CN 1211744 A 3/1999
(Continued)

OTHER PUBLICATIONS

Chinese Office Action and English translation thereof dated Jan. 27, 2011 in Chinese application 200680053394.0.
(Continued)

*Primary Examiner* — Hanh Phan
(74) *Attorney, Agent, or Firm* — Nixon & Vanderhye P.C.

(57) ABSTRACT

In an optical transmission system including a transmitter Tx and a receiver Rx connected via a fiber link F, where the receiver Rx is adapted to utilize Forward Error Correction (FEC) on received signals, a polarization scrambler is provided at the transmitter Tx to scramble the polarization state of a transmitted signal, a polarization delay line is provided at the receiver Rx for controlling the polarization mode dispersion induced distortion of a received signal, a feedback unit is provided at the receiver Rx for providing a feedback signal based on at least part of the received signal, and at least one polarization controller interconnects the fiber link F and the polarization delay line. The polarization controller is operable based on the feedback signal to mitigate the polarization mode dispersion of the signal.

20 Claims, 8 Drawing Sheets

U.S. PATENT DOCUMENTS

| | | | | |
|---|---|---|---|---|
| 7,151,898 B1* | 12/2006 | Phua et al. | | 398/158 |
| 2004/0202480 A1 | 10/2004 | Weid et al. | | |
| 2005/0036727 A1* | 2/2005 | Wijngaarden et al. | | 385/11 |
| 2005/0226633 A1 | 10/2005 | Liu | | |
| 2005/0254749 A1 | 11/2005 | Bulow | | |

FOREIGN PATENT DOCUMENTS

| | | |
|---|---|---|
| EP | 0 909 045 | 4/1999 |
| EP | 1 583 263 | 10/2005 |

OTHER PUBLICATIONS

Sunnerud H. et al., "Polarization-Mode Dispersion in High-Speed Fiber-Optic Transmission Systems", Journal of Lightwave Technology, vol. 20, No. 12, (Dec. 2002).

Heismann F. et al., "Automatic Compensation of First Order Polarization Mode Dispersion in a 10 Gb/s Transmission System", Proceedings of the European Conference on Optical Communication, vol. 1, pp. 529-530, (Sep. 20, 1998).

Zhihoug L. et al., "Experimental Evaluation of the Effect of Polarization Scrambling Speed on the Performance of PMD Mitigation Using FEC", Optical Fiber Communication Conference, vol. 1, pp. 208-210, (Feb. 23, 2004).

Wedding B. et al., "Enhanced PMD Mitigation by Polarization Scrambling and Forward Error Correction", Optical Fiber Communication Conference, vol. 54 and vol. 3, pp. waaa1-1, (2001).

International Search Report for PCT/BR2006/000245, mailed Feb. 22, 2007.

Poole et al, "Fading in Lightwave Systems due to Polarization-Mode Dispersion", IEEE Photonics Technol. Lett. vol. 3, No. 1, pp. 68-70 (1991).

Li et al, "Experimental evaluation of the effect of polarization scrambling speed on the performance of PMD mitigation using FEC", Proceedings OFC'2004, vol. 1, pp. 936-938 (2004).

Schlump et al, "Electronic equalization of PMD and chromatic dispersion induced distortion after 100 km standard single mode fibre at 10 Gb/s", Proceedings ECOC '98 vol. 3 pp. 535-536, (1998).

Ono et al, "Polarisation control method for suppressing polarisation mode dispersion in optical transmission systems" Journal of Lightwave Technology, vol. 12, 1994, p. 891-898.

Buchali et al, "Adaptative PMD compensation by electrical and optical techniques", J. Lightwave Technology vol. 22, n. 4, pp. 1116-1126, 2004.

Linares et al, "Comparison of First Order PMD Compensation Techniques"; Proceedings IEEE International Microwave and Optoelectronics Conference 2003, Foz do Iguac, Brasil.

Franz et al, "43 Gb/s SiGe based electronic equalizer for PMD and chromatic dispersion mitigation" Proceedings ECOC'2005, paper We1.3.1, vol. 3, pp. 333-334 (2005).

* cited by examiner

METHOD AND ARRANGEMENT FOR POLARIZATION MODE DISPERSION MITIGATION

This application is the U.S. national phase of International Application No. PCT/BR2006/000245, filed 8 Nov. 2006, which designated the U.S. and claims the benefit of U.S. Application No. 60/754,321, filed 29 Dec. 2005, the entire contents of each of which are hereby incorporated by reference.

TECHNICAL FIELD

The present invention concerns optical data transmission systems in general, and specifically concerns, at least in part, with methods and arrangements for mitigating polarization mode dispersion in such systems.

BACKGROUND

Single-mode optical fibers can support two polarization modes. If the core of a single-mode fiber is perfectly circular, the two polarization modes propagate with the same speed. However, due to manufacturing tolerance, the core of the fiber varies slightly from a perfect circle thereby causing the two polarizations modes to propagate at slightly different speed and causing polarization mode dispersion. Polarization mode dispersion (PMD) is a major problem in high bit-rate data optical transmissions due to the two polarization modes propagating at different group velocities, which in turn generates signal distortion. The difference in group velocity, arise from small residual birefringence due to fiber asymmetries or stress, either internal or externally applied. Both of internal stress and external perturbations vary with environmental conditions, such as the temperature along the link, and have a stochastic behavior. Signal degradation occurs when the time delay (DGD, i.e. Differential Group Delay) between the Principal States of Polarization (PSP), the fastest and the slowest polarization modes, is a large fraction of the bit slot, typically more than 10%, and the input State Of Polarization (SOP) equally excites both PSP. PMD is typically wavelength dependent, so that each channel of a WDM multichannel transmission in an optical fiber suffers different signal degradation.

Polarization dependent loss (PDL) or polarization dependent gain (PDG) also affects the quality of an optical transmission because they also vary stochastically when concatenated in a fiber link. Hence, PDL and PDG cause signals to have different amplitude according to their polarization state and degrade a receiver performance having a fixed decision threshold.

Due to the above there is a need for methods and arrangements enabling improved PMD mitigation in optical transmission systems.

SUMMARY

An objective of the present invention is to provide improved optical transmission.

A further object is to enable mitigation of polarization mode dispersion in optical transmission systems.

A specific object is to provide an optical transmission system with improved polarization mode dispersion mitigation.

An example embodiment of an optical transmission system according to the invention comprises a transmitter for transmitting optical signals via a fiber link to a receiver that is adapted to use FEC on received optical signals. Further, the system comprises at least one fast polarization scrambler for scrambling the polarization state of transmitted signals at the transmitter, at least one polarization delay line for controlling the polarization mode dispersion induced distortion of the scrambled transmitted signal at the receiver. Also, the system comprises a feedback unit at the receiver for providing a feedback signal based on the received signal, and at least one polarization controller connecting the fiber link and the polarization delay line, thereby enabling a reduction of the polarization mode dispersion of the signal.

A first non-limiting aspect of the present invention includes providing an optical transmission system, where a fast polarization scrambler is provided at a transmitter in combination with a polarization controller and a delay line at a forward error correction enabling receiver, where the polarization controller and optionally the delay line are controlled based on feedback from the received signal.

A second non-limiting aspect of the present invention includes fast scrambling the transmitted signal, delaying the polarization state of the signal, and controlling the polarization of the received signal and optionally the delay of the received signal based on feedback from the received signal.

Advantages of the present invention include, among others:

Improved polarization mode dispersion mitigation;
Reduced scrambling frequency for forward error correction, relaxing requirements on bandwidth of polarization scramblers;
Increased tolerance of forward error correction algorithms to higher values of polarization mode dispersion.

BRIEF DESCRIPTION OF THE DRAWINGS

Various aspects of the invention, together with further objects and advantages thereof, may best be understood by referring to the following description taken together with the accompanying drawings, in which.

ABBREVIATIONS

Figure 1:
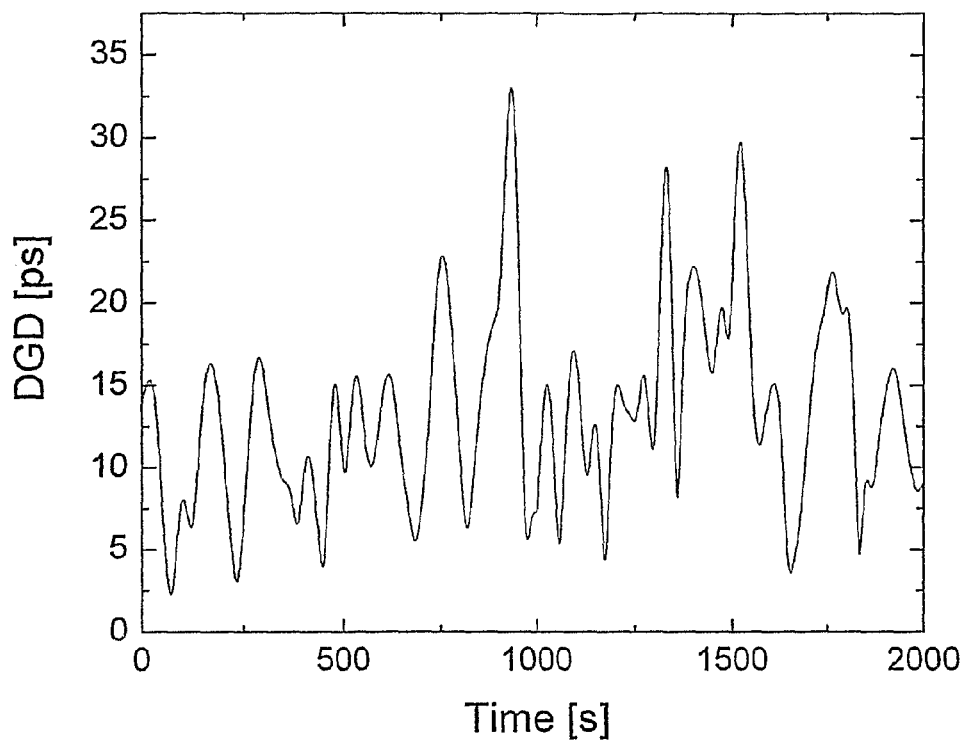
FIG. 1 illustrates a diagram of the temporal evolution of the differential group delay (DGD) for a known optical transmission system.

BER Burs Error Rate
DGD Differential Group Delay
FEC Forward Error Correction
PMD Polarization Mode Dispersion PSP Principal States of Polarization
RF Radio Frequency
SOP State Of Polarization
WDM Wave Diversity Multiplexing

DETAILED DESCRIPTION

In order to provide a better understanding of the problems with polarization mode dispersion and known methods for mitigation thereof, a more detailed discussion is provided below.

A number of different known techniques have been proposed and developed to overcome the residual dispersion due to PMD: PSP launching [1, 2], PMD compensation by addition of a polarization controlled delay line [3, 4], adaptive electronic filtering [5] or forward error correction [6]. For PSP launching the correcting system is split in two, the polarization controlled launching at the transmitter and the error signal being generated at the receiver. This has the disadvantage of requiring an independent connection between the transmitter and the receiver to send the feedback signal to the transmitter, strongly limiting the applicability of the technique. Furthermore, in transparent networks, where a channel may be routed from node to node without conversion from optics to electronics, the origin and destination of a given WDM channel may change with time, so that the amount forcing multiple interconnections between nodes precluding this solution to transparent networks. Nevertheless, the addition of a midspan polarization controller into a line has been proposed as a broadband PMD mitigation scheme even though it imposes the use of an optical channel for the long feedback path.

PMD compensators are single end solutions, where the polarization of the received signal is analyzed and launched into a delay line in series with the receiver. The polarization controller and eventually the delay line are controlled, according to the feedback signal, and driven to optimize the received signal [7]. While correcting for $1^{st}$ order PMD, the compensators add PMD to the link, thus increasing distortion due to $2^{nd}$ order PMD. This is a problem for high bit rate transmissions because of the large bandwidth of the transmitted signal. Delay line mitigation techniques were initially conceived for application in a single channel transmission, which means that all equipment used for correcting the distortion problem must be reproduced for each WDM channel in a line. Because PMD correlations decrease fast with wavelength, multiple channel correction with a single device gives poor results. WDM compensation with a parallel cascade of polarization controllers and birefringent wave plates was proposed in order to handle PMD distortion in a multiple optical channels transmission [8].

Electronic equalization in the optical receiver was also proposed to correct for PMD and chromatic dispersion at 10 Gb/s [9], but the technique is still unavailable for higher frequencies, although a 40 Gb/s device was recently reported [10].

Error correction techniques, such as forward error correction (FEC) combined with input polarization scrambling has been proposed to mitigate PMD effects in WDM transmissions [6]. The advantage of this method is that the FEC algorithm can correct for a great number of errors but is unable to deal with burst errors, which commonly occur with PMD effects. The scrambling of polarization states induces a variation of the ratio between the optical power in each of the principal states, alternating between low and high distortion states thus decreasing the probability of long error bursts. Alternative methods for PMD/PDL/PDG mitigation have been proposed by adding polarization scramblers along the line in such a way that the PMD of the link is scrambled giving a similar effect as an input polarization scrambling [11, 12].

One problem with the known method of multi-channel compensation proposed in [10] is that it is incompatible with fast polarization scrambling, which precludes the control of the polarization states of each channel. Because FEC requires fast polarization scrambling to be robust against PMD degradation it is incompatible with the polarization delay line mitigation techniques as described in [7, 8, and 10] so that only one of these two types of solutions can be used.

To illustrate a known polarization scrambling (PS)+FEC technique, consider the temporal evolution of the DGD (see FIG. 1) of a fiber link composed of three sections with mean DGD τl=8 ps for each link. According to the diagram in FIG. 1, the mean DGD (total PMD) ( ) of the fiber link is given by the rms sum of the DGD for each of the three fibers according to:

$$\tau = \sqrt{\sum_{i=1}^{3} \tau_i^2} = 8\sqrt{3} = 13.9 \text{ ps}$$

where τ denotes the mean DGD for the fiber link.

Figure 2:
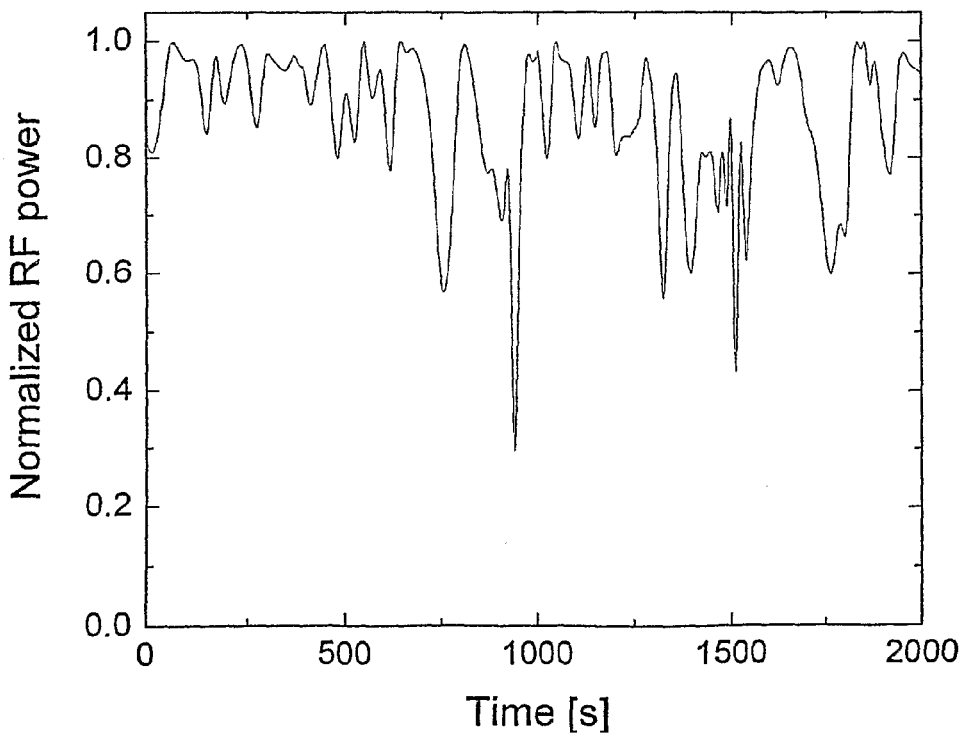
FIG. 2 illustrates a diagram of the normalized received RF power in a 10 Gb/s transmission for a fixed input state of polarization (SOP) and DGD corresponding to FIG. 1.

The diagram of FIG. 2 displays the normalized received RF power in a 10 Gb/s transmission for a fixed input SOP corresponding to the DGD time evolution of FIG. 1. The power penalty for first order PMD distortion can be estimated by the simple formula [14]:

$$\text{penalty(dB)} \approx 26 \frac{\Delta \tau^2}{T^2} \gamma (1 - \gamma)$$

where Δτ is the DGD, T is the bit period and γ is the fraction of the light power launched in one of the PSP. It is clear that long error bursts appear when the DGD is large and the input SOP populates both PSP. The known solution to this problem as given by [6] is to scramble the input polarization state such that the factor γ is varied periodically, thereby shortening the time during which the penalty is high.

Figure 3:
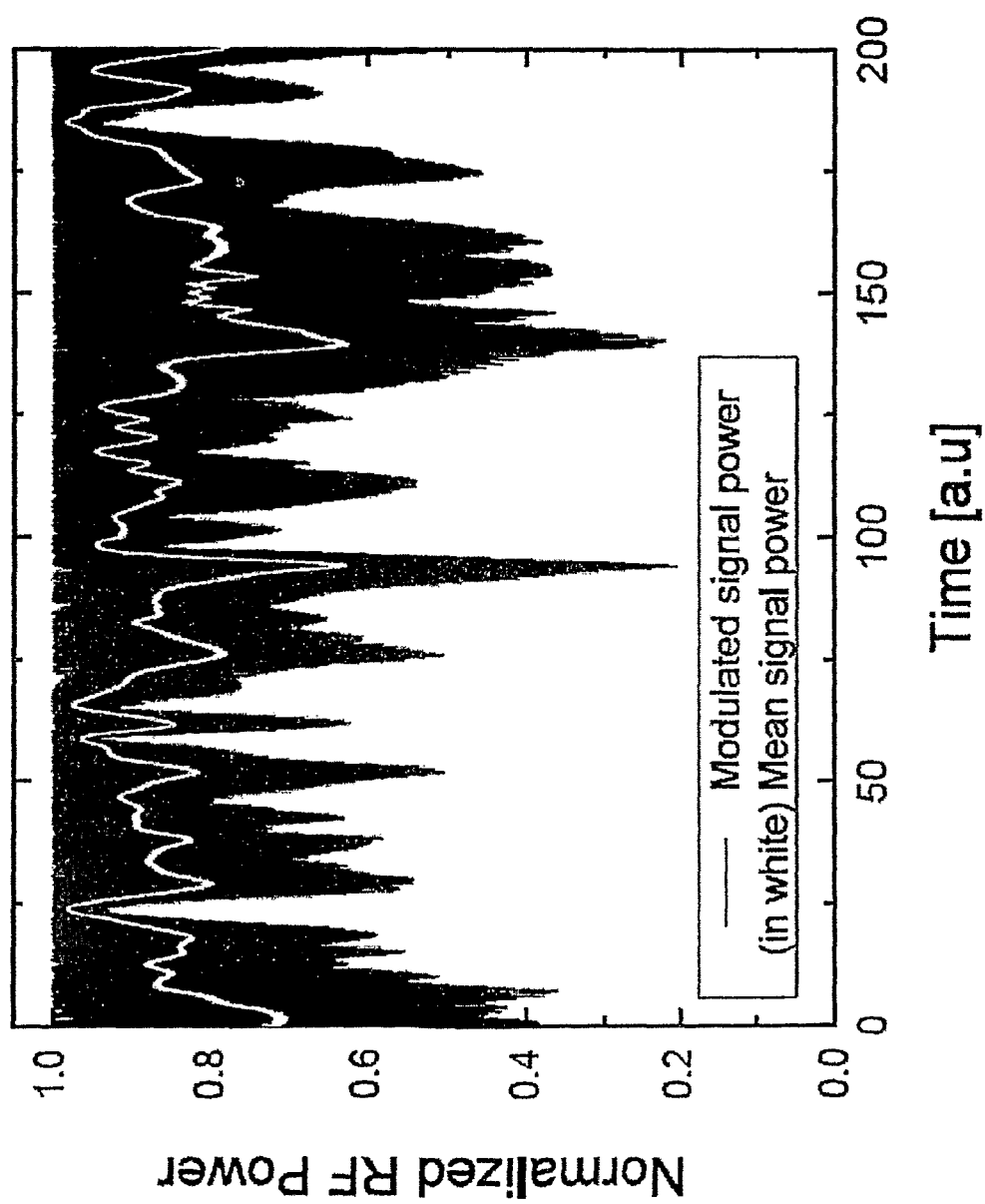
FIG. 3 illustrates the received radio frequency signal intensity when known scrambling is applied to the system of FIG. 2.

Because either the PSP or the input SOP or both are time varying the received signal intensity will be time dependent, being modulated at the scrambling frequency. Hence, the length of the error bursts will be strongly reduced depending on the RF modulation induced by the scrambler. The diagram of FIG. 3 displays the normalized received RF signal intensity of a received optical signal when scrambling is used. It is evident that both the mean and the peak-to-peak fluctuations vary with time according to the time varying total DGD of the fibers. In FIG. 3, the white line indicates the mean signal and the black area indicates the modulated signal.

In addition, polarization scrambling generates so-called jitter in the detected signal, which affects the clock recovery performance [13]. Hence, there is a trade-off between the better performance due to increasing scrambling frequency to shorten the burst error times, and e.g. Burst Error Rate (BER) degradation due to jitter. This problem is greater for high bit rates, where the burst error correction length is smaller.

To overcome the above mentioned problems and disadvantages with known methods and arrangements for PMD mitigation in optical transmission systems, an aspect of the present invention comprises a combination of at least one of fast polarization scrambler at a transmitter, a delay line, and a polarization controller operable depending on feedback signals based on the received signal, and a receiver enabling forward error correction (FEC). This is illustrated by the embodiment of FIG. 4.

Fast polarization scrambling differs from slow polarization scrambling in that the polarization controllers at a receiver can follow the scrambling in the case of slow scrambling and not in fast scrambling. This problem, among others, is overcome with the present invention.

Figure 4:
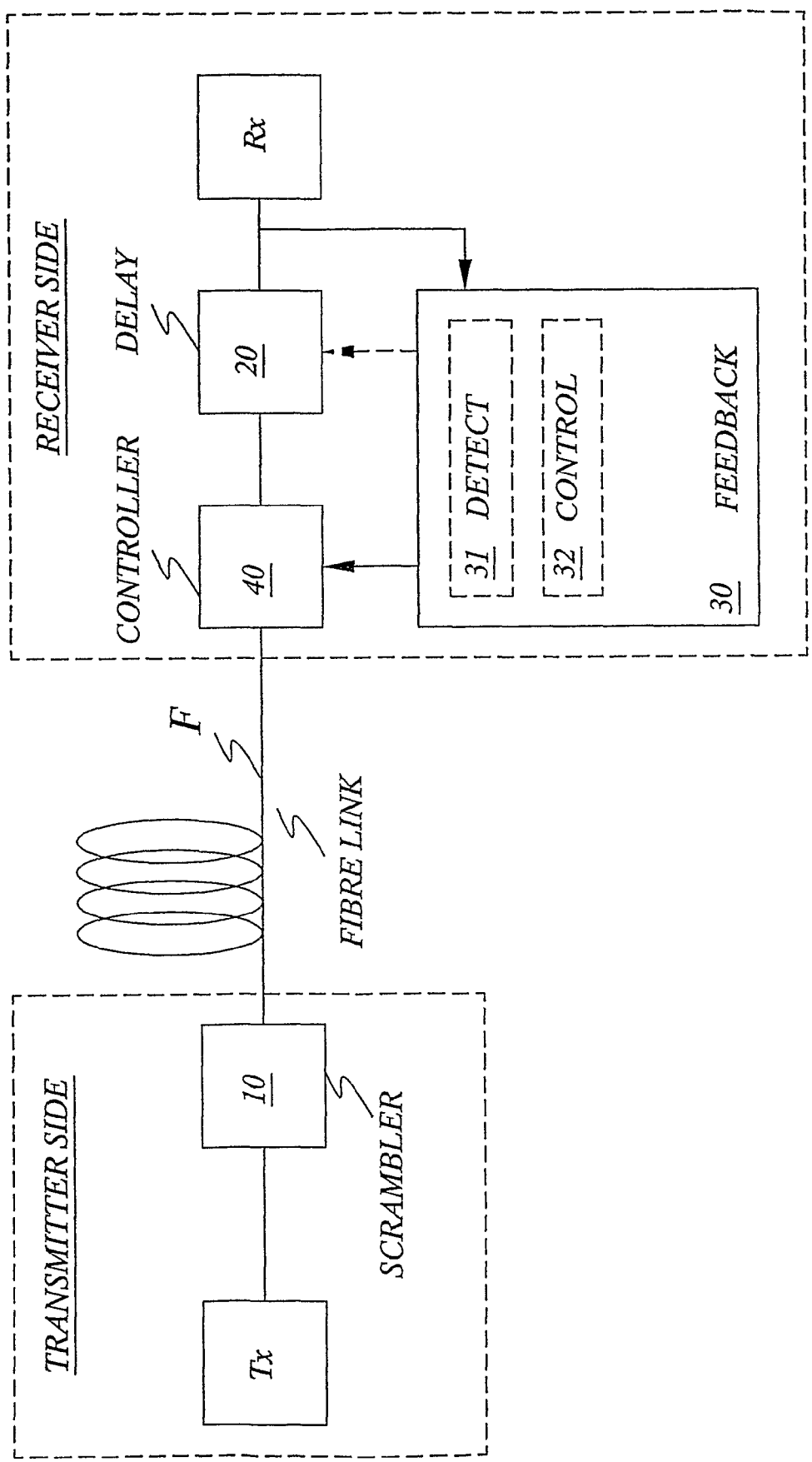
FIG. 4 illustrates an embodiment of a system according to the present invention.

In the most basic embodiment, as illustrated by FIG. 4, an optical transmission system includes at least a transmitter Tx connected to a receiver Rx via a fiber link F, where the receiver Rx is adapted for utilizing forward error correction (FEC). In order to mitigate PMD in the system, a fast polarization scrambler 10 is provided at an output of the transmitter Tx. The system further includes a delay line 20 at an input of the receiver Rx, and a polarization controller 40 arranged in series between the fiber link F and the delay line 20. The polarization controller 40 and optionally the delay line 20 are operated based on a feedback signal that is determined based on the received signal.

According to an embodiment of the invention, the system further comprises a feedback unit 30 for providing the feedback signal. The feedback unit 30 is arranged to provide a feedback signal based on at least part of the received signal. In this case, and the rest of the description the term "received signal" is defined as the signal that is received at an input of the receiver. This signal is a representation of the fast scrambled, polarization controlled and delayed transmitted signal.

According to a further embodiment, the feedback unit 30 provides control signals to the polarization controller 40 and optionally to the delay line 20. The feedback unit 30 can optionally be provided as two separate units, i.e. a detection unit 31 for taking part of the received signal and providing it as a feedback signal and a control unit 32 for using the feedback signal to provide control signals to the polarization controller 40 and optionally the delay line 20.

To further emphasize that the various units of the system are associated with either the transmitter Tx or the receiver Rx, dotted boxes are included in FIG. 4.

The solution according to embodiments of the present invention is thus to add a delay line 20 to a fast scrambled transmission and use the time varying amplitude and the mean value component of the feedback signal to adjust the coupling between the delay line 20 and the fiber link F to optimize the received signal.

When fast scrambling the SOP in a single channel transmission, the example combination of the delay line and the link PMD in such a way as to maximize the received signal will give rise to a very low total DGD as a unique solution because the input SOP is being fast scrambled. Hence, PMD mitigation will be achieved by first order DGD compensation and FEC will account for remaining effects of second or higher order PMD. In a multi-channel transmission, the addition of the delay line will be adjusted to maximize the RF power and minimize the peak-to-peak fluctuations of the total RF power.

Figure 5:
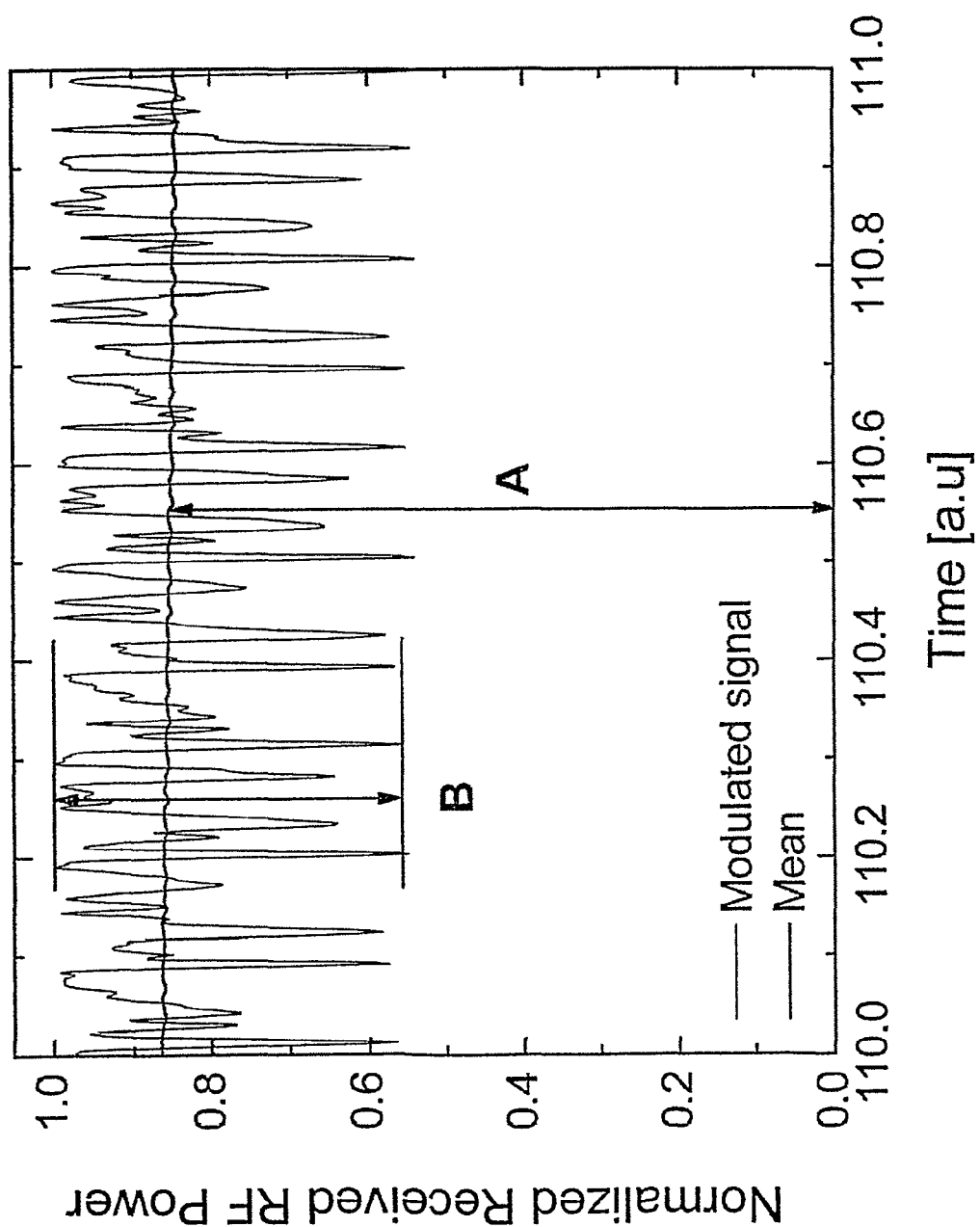
FIG. 5 illustrates a section of the diagram of FIG. 3.

To further illustrate the implications of the example embodiment of the present invention the diagram of FIG. 5 shows a zoom of FIG. 3 to show more clearly the mean value, as represented by the fairly smooth even line, and power fluctuations, as illustrated by the very irregular and spiky line. Specifically, FIG. 5 illustrates the received return to zero (RZ) 10-GB/s signal power as in FIG. 3. B is the high frequency peak-to-peak RF power fluctuations. A is the received RF power.

Figure 6:
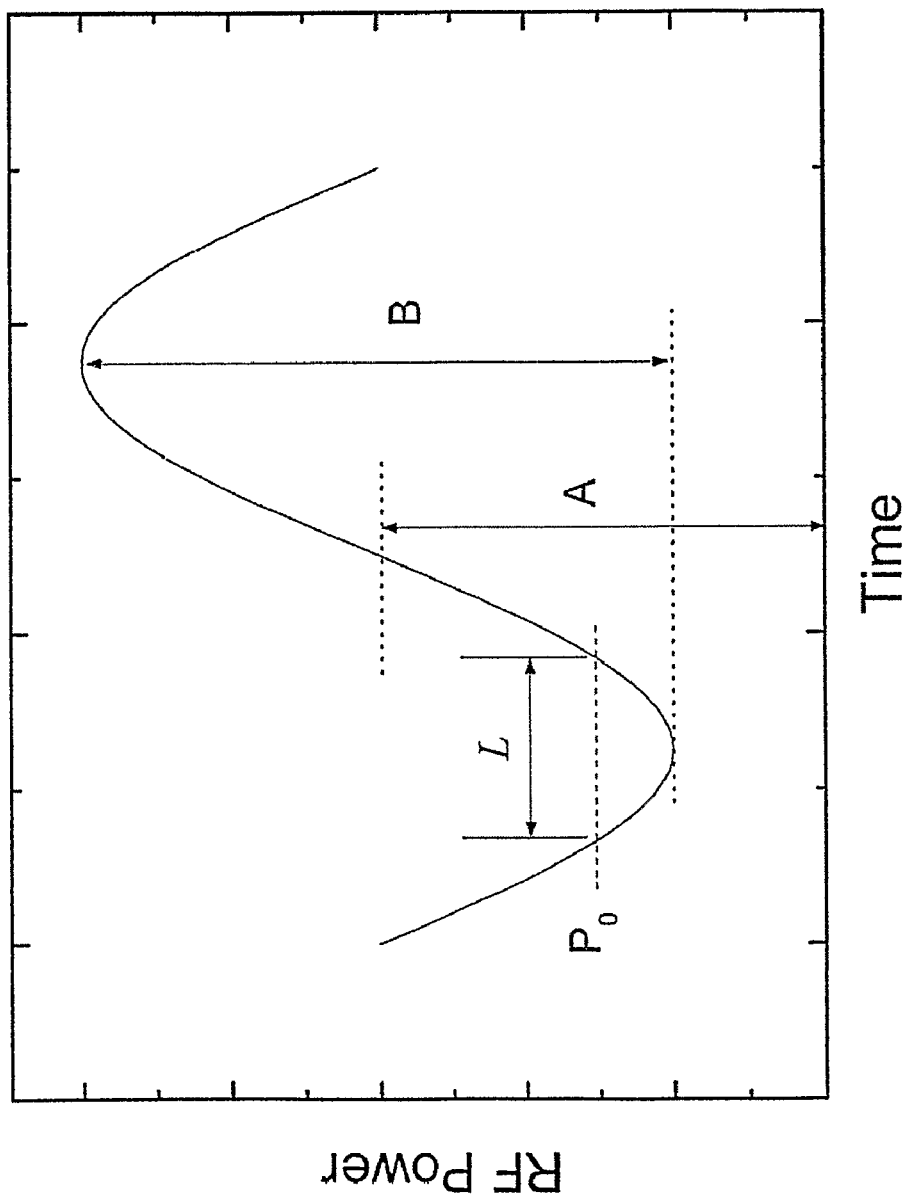
FIG. 6 illustrates a single swing of the radio frequency power.

For illustrative reasons assign A(t) to the mean value of the RF power and B(t) to the peak-to peak amplitude of the RF power variations as described in FIG. 5. Note that B(t) is not periodic because the SOP and PSP are being scrambled in a very complex trajectory in the Poincaré sphere. A single swing of the RF power P of a received optical signal can be approximated by the expression below and is further illustrated in FIG. 6:

$$P = A - \frac{B}{2}\cos(2\pi f_s t)$$

where $f_s$ is the scrambling frequency.

If $P_0$ and L are the limiting values of received power and burst length for FEC, the scrambling frequency $f_s$ will obey the following inequality:

$$f_s \geq \frac{1}{\pi L}\left|\cos^{-1}\left(2\frac{A - P_0}{B}\right)\right|$$

The expression above clearly indicates that increasing A or decreasing B will lower the limit for the fast scrambling frequency, thus improving the tolerance of the FEC based mitigation methods [6], [12] and [13] to high levels of DGD.

Figure 7:
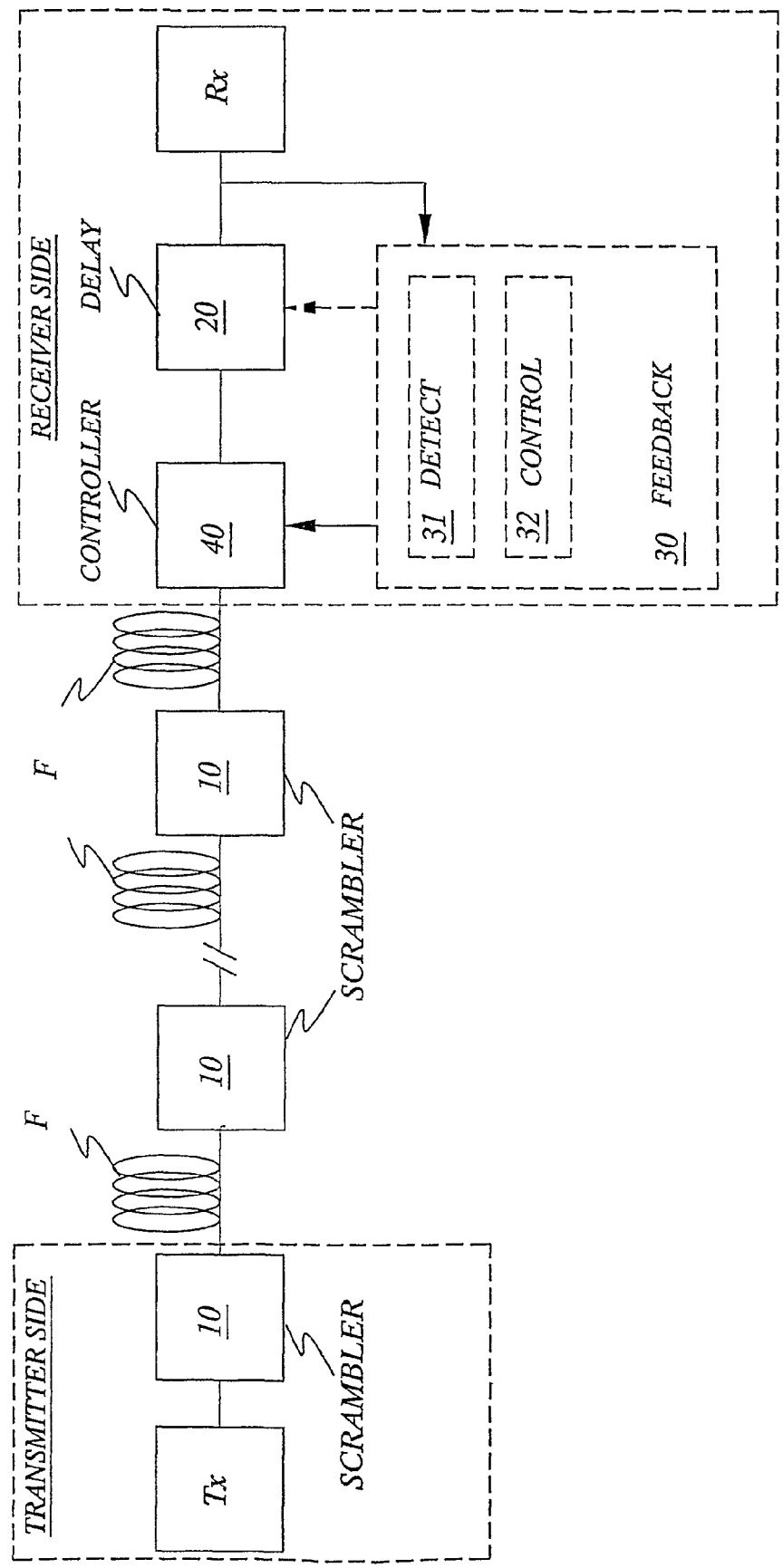
FIG. 7 illustrates another embodiment of a system according to the present invention.

Another embodiment of a system, according to the invention, comprising a plurality of fast polarization scramblers along the fiber link is depicted in FIG. 7. The plurality of fast polarization scramblers 10 are inserted in the transmitter Tx and/or along the fiber link F. In this embodiment, the link F comprises a plurality of fiber links F. At the receiver Rx, a polarization controller 40 is arranged in series between the fiber link F and a polarization delay line 20. After the delay line 20, part of the optical power of the received signal is fed into a feedback unit 30. The feedback unit 30 includes a detector 31 that provides a feedback signal corresponding to e.g. the mean value of the RF power A and to the RF modulation amplitude B. These two quantities are supplied to a control unit 32 utilizing an algorithm that controls the polarization controller 40 in such a way that the mean RF power A of the received signal is driven to a maximum and the RF modulation amplitude B of the received signal is driven to a minimum.

In accordance with FIG. 4, dotted boxes are included in the embodiment of FIG. 7 to illustrate that the various units are associated with either the transmitter Tx or the receiver Rx.

The feedback signal or representations thereof can optionally be based on the difference between the values A and B, the FEC rates or some other suitable parameter derivable from the received signal.

Based on the same principle above different representations of the received signal can, according to the invention, be used as feedback signals. Thereby, the total signal distortion can be mitigated by appropriately adding a PMD vector, characterized by the delay line, to the scrambling PMD vector of the fiber link. The total DGD vector and PSP states will be fast scrambled under control optimizing the received feedback signal, which can be the total detected RF power, a spectrally filtered portion of this spectrum, the clock signal, or the FEC rates.

Further embodiments of the present invention comprise one or a plurality of power control devices, such as variable attenuators or amplifiers at different locations along the fiber link, i.e. between the fiber link and the polarization controller, between the polarization controller and the delay line, or between the delay line and the receiver. In addition, a further polarization controller can be arranged at the transmitter Tx to modulate the input polarization of the transmitted signal over e.g. a well defined trajectory in the Poincaré sphere. According to another specific embodiment, the operation of the further polarization controller at the transmitter can be optimized based on a control algorithm utilizing the above mentioned trajectory of the input polarization.

The polarization controller and/or polarization scrambler can include a single-stage or multi-stage controller/scrambler. The respective controllers/scramblers can be driven by various waveforms e.g. triangular, or sinusoidal waveforms.

The operational frequency of the polarization scrambler or scramblers can be equal or individual, depending on the system in question. Each such frequency can be configured proportional to the square root of a prime number, or be arranged in some other manner. Further, the scrambling of the scrambler(s) can be performed over part of or the entire Poincaré sphere.

According to known measures, the polarization controller can comprise a fiber-based controller that is actuated by e.g. stress applying devices based on piezoelectric materials, such as lead zirconium titanate (PZT).

The optical transmission system can be further adapted to employ any one of non-return-to-zero (NRZ) formatting, return-to-zero (RZ) formatting, or on-off keying modulation formatting.

Finally, an example system according to the invention can be configured to utilize two or more WDM channels from transmitting optical signals. The WDM channels can be separated into two or more groups, each of which has a separate polarization controller and delay line assigned to it. Feedback signals can be based on the FEC error correction rates of all WDM channels.

The invention, among others, is an improvement over known PMD mitigation techniques in that it combines at least two different mitigation techniques in a manner to improve the PMD mitigation. The proposed scheme has at least the advantages of allowing optimization with lower scrambling frequencies because the duration of error bursts depends not only on the scrambling frequency but also in the attenuation of the detected signal. Increasing the mean value of the received signal and minimizing its modulated amplitude give rise to smaller bursts for a given frequency, thus relaxing requirements that impact system performance through jitter tolerance.

Comparative Simulation Results

Figure 8:
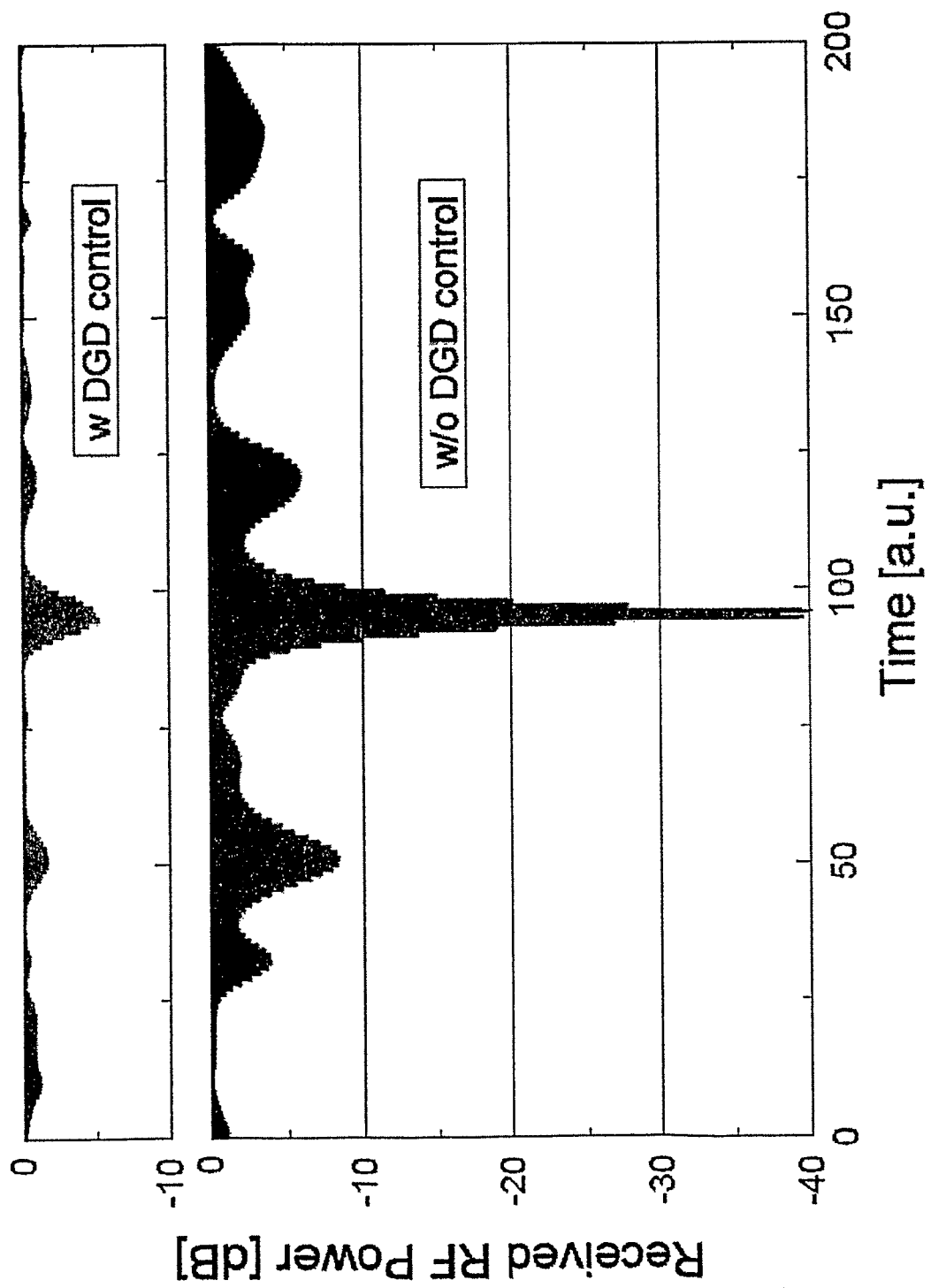
FIG. 8 is a diagram illustrating simulation results for a comparison between a known PMD mitigation method and an embodiment of the invention.

Comparative simulations have been performed to further illustrate the impact of the embodiments of the current invention in relation to prior art solutions, particularly the solution of [11]. The diagram of FIG. 8 displays the received RF power as a function of time for a scrambled 10 Gb/s Non-Return to Zero (NRZ) transmission as a function of time, with the present invention embodiment implemented and without the present invention implemented. It is evident that the received signal is strongly improved by the embodiment of the invention.

Figure 9:
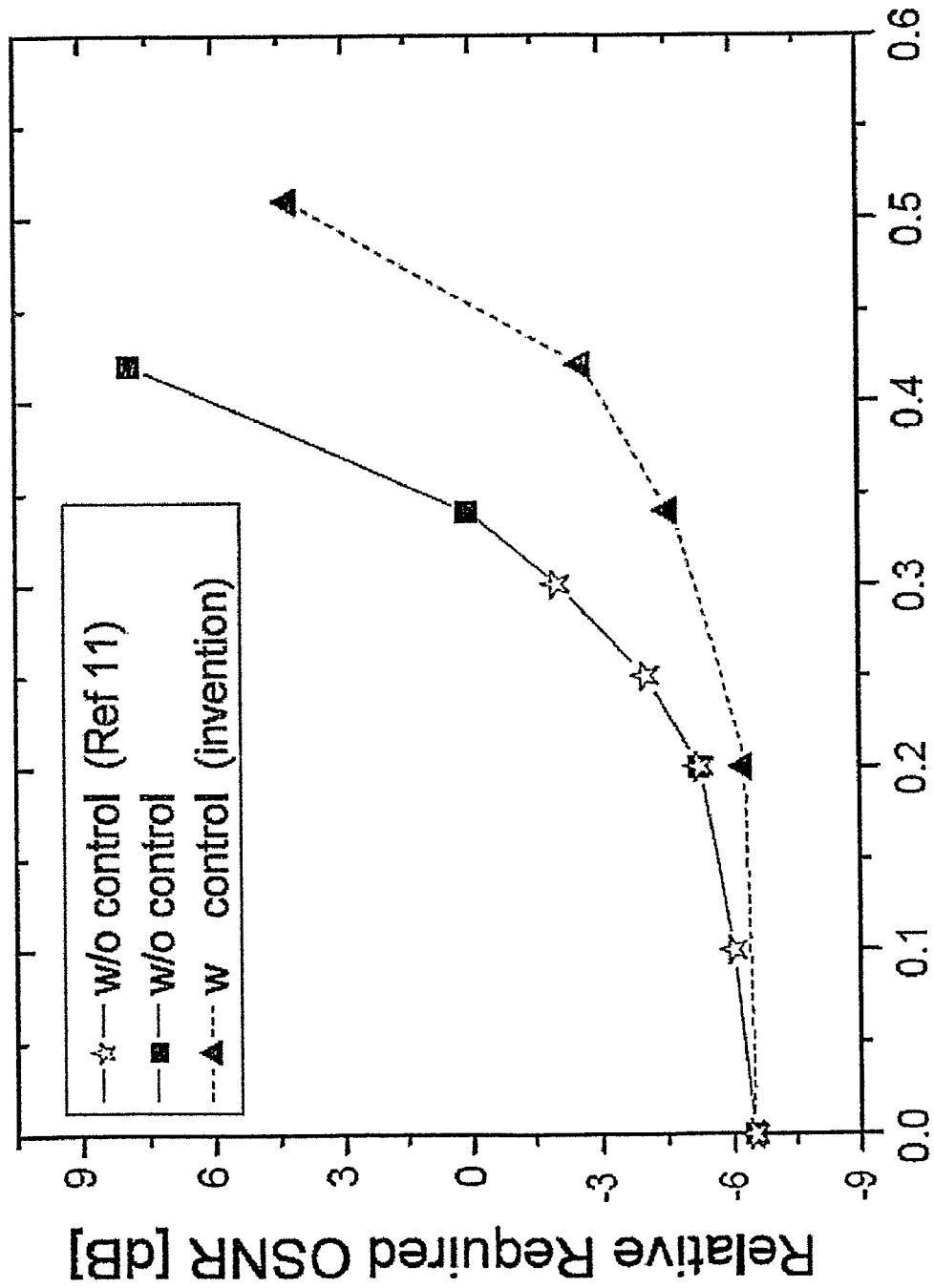
FIG. 9 is another diagram simulation results for a comparison between a known PMD mitigation method and an embodiment of the invention.

To further clarify the improvement of the invention simulations of the relative required Optical Signal to Noise Ratio (OSNR) as a function of the mean DGD for such a transmission with only FEC and polarization scrambling [11] and with the present invention embodiment including DGD control. FIG. 9 plots the results, clearly showing a strong improvement on mean DGD tolerance due to the present invention embodiment. In FIG. 9 the results from [11] are represented by white stars, further simulated values for [11] are represented by black squares, and the simulated results for the present invention embodiment are represented by black triangles.

An embodiment of a method for improved PMD mitigation will be described with reference to the embodiment of an optical transmission system in FIG. 4.

A method for improved PMD mitigation according to the invention embodiment includes fast scrambling the polarization state of a transmitted signal at the transmitter, subsequently delaying the polarization state of the scrambled transmitted signal, thereby controlling the polarization state of the scrambled transmitted signal. The method further includes providing a feedback signal based on at least part of the received signal, and controlling the polarization state of the scrambled transmitted signal based on the whole or only part of the feedback signal to reduce the polarization mode dispersion of the signal. Optionally also the delaying can be performed based on part of the feedback signal.

Advantages of the present invention, among others, include:
 Improved polarization mode dispersion mitigation;
 Reduced scrambling frequency for forward error correction, relaxing requirements on bandwidth of polarization scramblers;
 Increased tolerance of forward error correction algorithms to higher values of polarization mode dispersion.
Advantages of the present invention include:
 Improved polarization mode dispersion mitigation
 Reduced scrambling frequency for forward error correction, relaxing requirements on bandwidth of polarization scramblers.
 Increased tolerance of forward error correction algorithms to higher values of polarization mode dispersion.

It will be understood by those skilled in the art that various modifications and changes may be made to the present invention without departure from the scope thereof, which is defined by the appended claims.

REFERENCES

[1]. L. C. B. Linares and J. P. von der Weid "*Comparison of First Order PMD Compensation Techniques*"; Proceedings IEEE International Microwave and Optoelectronics Conference 2003, Foz do Iguaçú, Brasil.

[2]. T. Ono, S. Yamazaki, H. Shimizu, and H. Emura, "*Polarisation control method for suppressing polarisation mode dispersion in optical transmission systems*" Journal of Lightwave Technology, vol. 12, 1994, p. 891-898.

[3]. F. Heismann, D. A. Fishman, D. L. Wilson, "Method and apparatus for automatic compensation o first-order polarisation mode dispersion (PMD)" U.S. Pat. No. 5,930,414

[4]. J. P. von der Weid, L. C. B. Linares and G. V. de Faria; "Method and apparatus for Polarization Mode Dispersion Compensation" US Patent Application 20040202480, (2004).

[5]. F. Buchali and H. Bülow "*Adaptative PMD compensation by electrical and optical techniques*", J. Lightwave Technology vol 22, n. 4, pp 1116-1126, (2004).

[6]. B. Wedding and C. N. Haslach; "*Enhanced PMD Mitigation by polarization scrambling and forward error correction*". Proceedings OFC'2001, vol 3, pp. WAA1-1-3, (2001)

[7]. H. Sunnerud, C. Xie, M. Karlsson, R. Samuelsson and P. A. Andrekson; "*Comparison between different PMD Compensation Techniques*", J. Lightwave Technology vol 20, n. 3, pp 368-378, (2002).

[8]. H. Bülow; "Multiwavelength CD and PMD compensator" US Patent Application 2005254749, (2005).

[9]. D. Schlump, B. Wedding and H. Bülow, "Electronic equalization of PMD and chromatic dispersion induced distortion after 100 km standard single mode fibre at 10 Gb/s", Proceedings ECOC '98 vol 3 pp 535-536, (1998).

[10]. B. Franz, D. Rösener, R. Dishler, F. Buchali, B. Junginger, T. F. Meister and K. Aufinger, "43 *Gb/s SiGe based electronic equalizer for PMD and chromatic dispersion mitigation*" Proceedings ECOC'2005, paper We1.3.1, vol 3, pp. 333-334 (2005)

[11]. J. L. van Wijngaarden, X. Liu and C. Xie; "System and method for multichanel mitigation of PMD/PDL/PDG" US Patent Application 20050036727, (2005)

[12]. X. Liu; "Method and apparatus for PMD/PDL/PDG mitigation", US Patent Application 20050226633, (2005)

[13]. Z. Li, J. Mo, Y. Dong, Y. Wang and C. Lu; "Experimental evaluation of the effect of polarization scrambling speed on the performance of PMD mitigation using FEC", Proceedings OFC'2004, vol. 1, pp 936-938 (2004).

[14]. C. D. Poole, R. W. Tkack, A. R. Chraplyvy and D. A. Fisherman "Fading in Lightwave Systems due to Polarization-Mode Dispersion", IEEE Photonics Technol. Lett. Vol 3, no 1, pp. 68-70 (1991).

The invention claimed is:

1. An optical transmission system comprising:
a transmitter (Tx) adapted to transmit optical signals via at least one fiber link (F) to a receiver (Rx), said receiver (Rx) being adapted to utilize Forward Error Correction (FEC) on received optical signals;
at least one fast polarization scrambler arranged at the transmitter (Tx) to scramble a polarization state of the transmitted signal;
at least one polarization delay line arranged at said receiver (Rx) for controlling a polarization mode dispersion induced distortion of the scrambled transmitted signal;
feedback means arranged at said receiver (Rx) for providing a feedback signal based on at least part of the received signal, wherein said feedback signal comprises representations of both a RF power A and a RF modulation amplitude B of the received signal; and
at least one polarization controller connecting said fiber link (F) and said polarization delay line, said polarization controller is adapted to be operable based on said feedback signal to enable a reduction of the polarization mode dispersion of the optical signal.

2. The system according to claim 1, wherein said feedback means further comprises:
detecting means adapted for providing said feedback signal based on at least part of the received signal; and
control means adapted for providing control signals to said polarization controller based on said feedback signal.

3. The system according to claim 2, wherein said control means are further adapted to provide the control signals to said delay line based on said feedback signal.

4. The system according to claim 3, wherein said delay line is adapted to be operable based on said feedback signal.

5. The system according to claim 1, comprising a plurality of polarization scramblers arranged between the transmitter (Tx) and the receiver (Rx).

6. The system according to claim 1, wherein said feedback signal comprises a representation of a difference between the RF power A and the RF modulation amplitude B of the received signal.

7. The system according to claim 1, wherein said feedback signal comprises a representation of FEC correction rates at the receiver.

8. The system according to claim 1, wherein said system is adapted to utilize at least two WDM channels.

9. A method of mitigating polarization mode dispersion in an optical transmission system comprising a transmitter connectable to a receiver via a fiber link, said receiver is adapted for utilizing forward error correction on received signals, the method comprising:
fast scrambling a polarization state of a transmitted signal at the transmitter;
delaying the polarization state of the scrambled transmitted signal at the receiver;
providing a feedback signal based on at least part of the received signal, wherein said feedback signal comprises representations of both a RF power A and a RF modulation amplitude B of the received signal; and
controlling the polarization state of the scrambled optical signal based on said feedback signal to reduce a polarization mode dispersion of the optical signal.

10. The method according to claim 9, wherein said delaying step is based on said feedback signal.

11. The method according to claim 9, wherein said feedback signal providing step further comprises
providing said feedback signal based on at least part of the received optical signal; and
providing control signals to a polarization controller based on said feedback signal.

12. The method according to claim 9, wherein said delaying step is based on said feedback signal.

13. The method according to claim 9, wherein said feedback signal comprises a representation of a difference between the RF power A and the RF modulation amplitude B of the received signal.

14. The method according to claim 9, wherein said feedback signal comprises a representation of FEC correction rates at the receiver.

15. The method according to claim 9, wherein said method is adapted to utilize at least two WDM channels.

16. An optical system comprising a transmitter side and a receiver side arranged to be operably connected to each other via an optical fiber link,
wherein the transmitter side comprises:
an optical transmitter configured to generate an optical signal based on input data; and
a fast scrambler operably connected to the optical transmitter and configured to scramble a polarization state (PS) of the optical signal generated by the optical transmitter and output the scrambled optical signal to the fiber link,
wherein the optical receiver comprises:
a polarization controller arranged to operably connect to the optical fiber link to receive the scrambled optical signal transmitted from the transmitter side and arranged to receive a feedback signal from a feedback unit, the polarization controller being configured to reduce a polarization mode dispersion (PMD) of the scrambled optical signal based on the feedback signal and output a polarization-controlled scrambled optical signal;
a delay line operably connected to the polarization controller and configured to delay the polarization controlled scrambled optical signal from the polarization controller and output a received signal, the received signal being a representation the optical signal from the transmitter side that has been fast scrambled, polarization controlled and delayed;

a receiver operably connected to the delay line and configured to output data based on the received signal utilizing forward error correction (FEC); and the feedback unit operably connected to the delay line and to the polarization controller, the feedback unit being configured to generate the feedback signal based on the at least part of the received signal and send the feedback signal to the polarization controller, wherein the feedback signal is generated based on a mean and on a modulation amplitude of a RF power of the received signal.

17. The optical system of claim 16, wherein the feedback unit is configured to generate the feedback signal so as to maximize the mean RF power and to minimize the modulation amplitude of the RF power of the received signal.

18. The optical system of claim 16, wherein the feedback unit is configured to generate the feedback signal based on a difference between the mean and the modulation amplitude of the RF power of the received signal.

19. The optical system of claim 16, wherein the feedback unit is configured to generate the feedback signal further based on a FEC rate of the receiver.

20. The optical system of claim 16, wherein the delay line is arranged to receive the feedback signal from the feedback unit, the delay line being configured to delay the polarization controlled scrambled optical signal from the polarization controller based on the feedback signal.

* * * * *